United States Patent
Uno et al.

(10) Patent No.: US 8,242,881 B2
(45) Date of Patent: Aug. 14, 2012

(54) METHOD OF ADJUSTING REFERENCE INFORMATION FOR BIOMETRIC AUTHENTICATION AND APPARATUS

(75) Inventors: Kazuya Uno, Kawasaki (JP); Koichiro Niinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 870 days.

(21) Appl. No.: 12/058,083

(22) Filed: Mar. 28, 2008

(65) Prior Publication Data
US 2008/0240515 A1    Oct. 2, 2008

(30) Foreign Application Priority Data
Mar. 28, 2007    (JP) .................. 2007-085785

(51) Int. Cl.
G05B 19/00    (2006.01)
G05B 23/00    (2006.01)
G06F 7/00    (2006.01)
H04Q 9/00    (2006.01)

(52) U.S. Cl. ............ 340/5.52; 340/5.53; 340/5.82; 340/5.83; 340/5.84

(58) Field of Classification Search ........ 340/5.52–5.53, 340/5.82–5.84; 382/115–127
See application file for complete search history.

(56) References Cited

U.S. PATENT DOCUMENTS

| | | | | |
|---|---|---|---|---|
| 5,229,764 A * | 7/1993 | Matchett et al. | ............ | 340/5.52 |
| 6,160,903 A * | 12/2000 | Hamid et al. | ............ | 382/115 |
| 6,173,068 B1 * | 1/2001 | Prokoski | ............ | 382/115 |
| 6,549,118 B1 * | 4/2003 | Seal et al. | ............ | 340/5.82 |
| 7,079,007 B2 * | 7/2006 | Siegel et al. | ............ | 340/5.52 |
| 7,088,220 B2 * | 8/2006 | Kotzin | ............ | 340/5.82 |
| 7,184,579 B2 * | 2/2007 | Mizoguchi | ............ | 382/124 |
| 7,734,067 B2 * | 6/2010 | Kim et al. | ............ | 382/115 |
| 2003/0046237 A1 * | 3/2003 | Uberti | ............ | 705/44 |
| 2006/0016868 A1 * | 1/2006 | Bonalle et al. | ............ | 235/380 |
| 2006/0047614 A1 | 3/2006 | Cohen et al. | | |
| 2006/0078177 A1 * | 4/2006 | Niinuma et al. | ............ | 382/124 |
| 2006/0104485 A1 * | 5/2006 | Miller et al. | ............ | 382/115 |

FOREIGN PATENT DOCUMENTS

| | | |
|---|---|---|
| JP | 2000-215313 A | 8/2000 |
| JP | 2004-78686 A | 3/2004 |
| JP | 2005-182184 A | 7/2005 |

(Continued)

OTHER PUBLICATIONS

European Search Report dated Jul. 30, 2008, issued in corresponding European Patent Application No. 08102265.9.

(Continued)

*Primary Examiner* — Daniel Wu
*Assistant Examiner* — Mohamed Barakat
(74) *Attorney, Agent, or Firm* — Westerman, Hattori, Daniels & Adrian, LLP

(57) ABSTRACT

According to an aspect of an embodiment, a method of adjusting reference information for biometric authentication, comprises storing the reference information including reference biometric data and threshold values corresponding to a plurality of users, respectively, obtaining biometric data of a user by inputting biometric information of the user, calculating a matching ratio of the biometric data with the reference biometric data of each of the users, respectively, comparing the matching ratio of each of the users with the threshold value of each of the users, respectively, determining which of the matching ratios exceed the corresponding threshold values and adjusting the threshold values which are exceeded by the corresponding matching ratios so that all the matching ratios but the highest matching ratio become lower than the adjusted threshold values, respectively.

15 Claims, 15 Drawing Sheets

FOREIGN PATENT DOCUMENTS

KR  10-2004-0028854 B1  4/2004
KR  10-2007-0023022 A   2/2007

OTHER PUBLICATIONS

Montejo-Raez, Arturo et al.; "Selection Strategies for Multi-label Text Categorization"; FINTAL 2006, LNAI 4139, pp. 585-592, 2006.

Yang, Yiming; "A Study on Thresholding Strategies for Text Categorization"; SIGIR'01, pp. 137-145, Sep. 9-12, 2001.

Zadrozny, Bianca et al..; "Transforming Classifier Scores into Accurate Multiclass Probability Estimates"; SIGKDD '02, pp. 694-699, 2002.

Korean Office Action dated Jan. 14, 2010, issued in corresponding Korean Patent Application No. 10-2008-0026921.

Korean Office Action dated Jan. 14, 2010, issued in corresponding Korean Patent Application No. 10-2008-00269212.

Japanese Office Action dated Dec. 20, 2011, issued in corresponding Japanese Patent Application No. 2007-085785.

\* cited by examiner

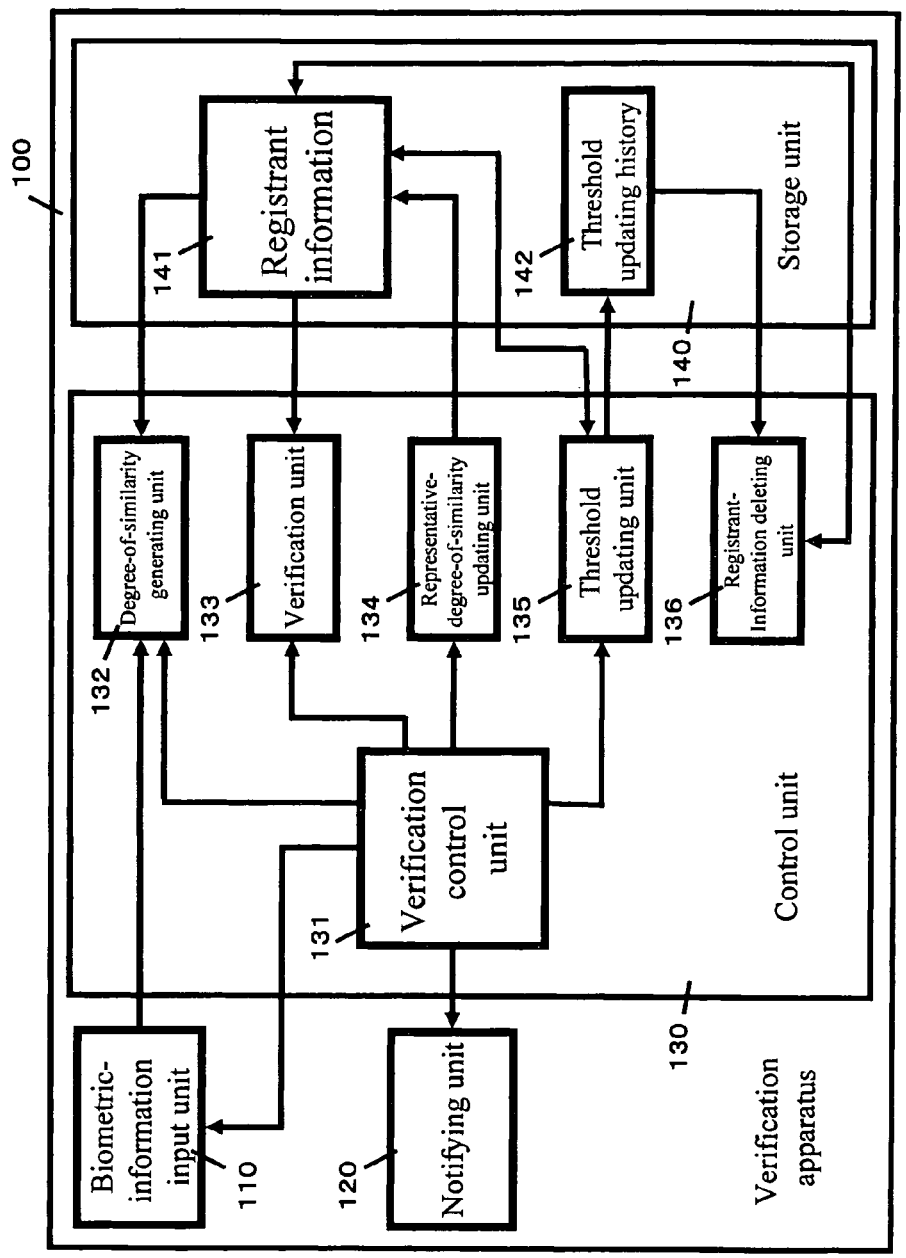

Fig. 3

| ID | Threshold | Representative degree of similarity | Verification information |
|---|---|---|---|
| A001 | 100 | 230 | xxxxxxxxxxxxxxx |
| A002 | 100 | 340 | xxxxxxxxxxxxxxx |
| A003 | 100 | 280 | xxxxxxxxxxxxxxx |
| ... | ... | ... | ... |

Fig. 4

| Target ID | Threshold fluctuation range | Related ID |
|---|---|---|
| A009 | 50 | A024, A049 |
| A002 | 50 | A037 |
| ... | ... | ... |

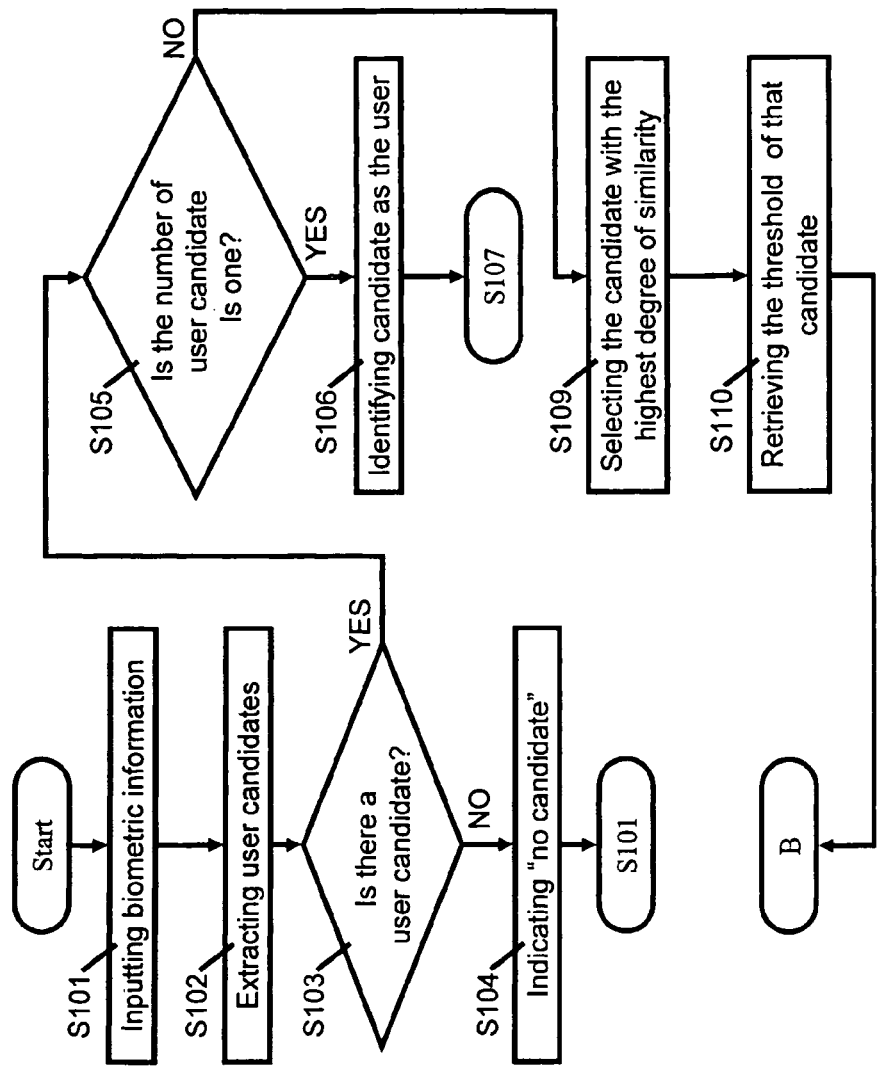

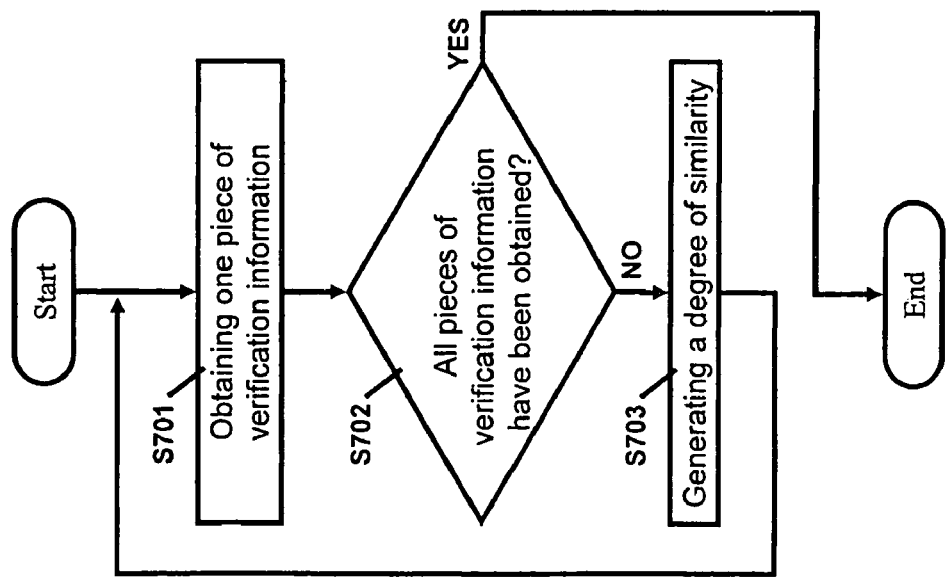

METHOD OF ADJUSTING REFERENCE INFORMATION FOR BIOMETRIC AUTHENTICATION AND APPARATUS

BACKGROUND

The present technique relates to verification apparatuses, verification methods, and verification programs for verifying whether a user is a pre-registered (e.g. an enrolled) registrant on the basis of biometric information, and more particularly, to a verification apparatus, a verification method and a verification program for identifying the user with high accuracy even on the basis of the input biometric information of low quality.

In the related art, biometric identification apparatuses and methods are described in, for example, Japanese Laid-open Patent Publication Nos. 2000-215313 and 2005-182184.

SUMMARY

According to an aspect of an embodiment, a method of adjusting reference information for biometric authentication, comprises storing the reference information including reference biometric data and threshold values corresponding to a plurality of users, respectively, obtaining biometric data of a user by inputting biometric information of the user, calculating a matching ratio of the biometric data with the reference biometric data of each of the users, respectively, comparing the matching ratio of each of the users with the threshold value of each of the users, respectively, determining which of the matching ratios exceed the corresponding threshold values and adjusting the threshold values which are exceeded by the corresponding matching ratios so that all the matching ratios but the highest matching ratio become lower than the adjusted threshold values, respectively.

BRIEF DESCRIPTION OF THE DRAWINGS

FIG. 2 is a functional block diagram of the structure of a verification apparatus according to the embodiment;

FIG. 3 illustrates exemplary registrant information;

FIG. 4 illustrates an exemplary threshold updating history;

FIGS. 5A and 5B are flowcharts of a verification process;

FIG. 12 is a flowchart of a process of generating a degree of similarity.

DESCRIPTION OF THE PREFERRED EMBODIMENTS

A verification apparatus, a verification method, and a verification program according to preferred embodiments of the present technique will be described with reference to the accompanying drawings.

Biometric authentication systems are classified into one-to-one matching and one-to-N matching. One-to-N matching is the method of identifying a person solely on the basis of biometric information, without using additional identifying means, such as entry of identification (ID) or the like. In general, one-to-N matching is performed using an identification threshold regarding the degree of similarity on a system-by-system basis. The degree of similarity, which is obtained by sequentially comparing biometric information obtained from the user with pieces of pre-registered biometric information, is compared with the identification threshold, thereby identifying the user.

A system based on the identification threshold which is set on a system-by-system basis in the foregoing manner has a higher false reject rate when the identification threshold is strict. In contrast, a false accept rate is increased by setting a lenient identification threshold.

First Embodiment

A verification apparatus 100 according to a first embodiment of the present technique is configured to store an identification threshold (hereinafter simply referred to as a "threshold") not on a system-by-system basis, but in units of pieces of pre-registered biometric information, and to dynamically change the threshold during operation. Therefore, identification errors due to entry of low-quality biometric information are prevented from occurring, without affecting the identification accuracy of the overall system.

A verification method performed by the verification apparatus 100 according to the embodiment will be schematically described. In the following description, in order to avoid confusion, biometric information registered in advance for one-to-N matching is referred to as "verification information" (e.g. "biometric reference"), and biometric information entered during operation is referred to as "biometric information".

Figure 1B:
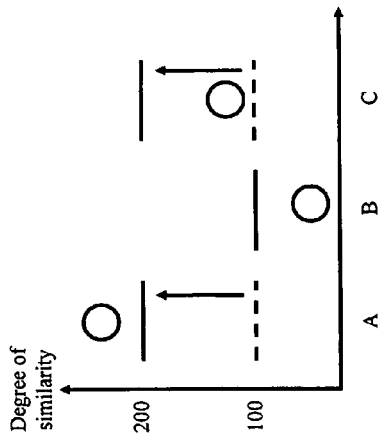
FIG. 1B illustrates the verification method according to the embodiment.
Figure 1D:
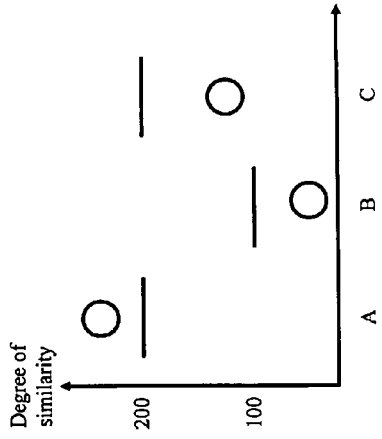
FIG. 1D illustrates the verification method according to the embodiment.
Figure 1A:
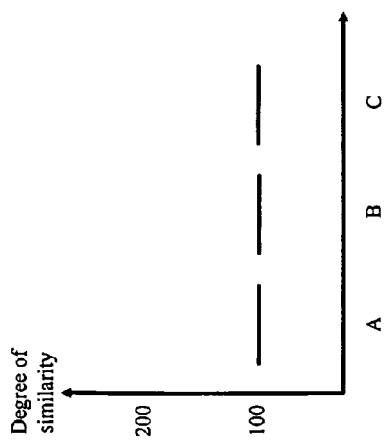
FIG. 1A illustrates a verification method according to an embodiment.

FIGS. 1A to 1D illustrate a verification method according to the embodiment. FIG. 1A illustrates thresholds in a state immediately after registration of verification information. In this example, three pieces of verification information with IDs "A", "B", and "C", respectively, are registered. For each of the pieces of verification information, a threshold is provided. These thresholds are set to initial values. In this example, the initial values are set to "100".

FIG. 1B illustrates a state in which biometric information of a user corresponding to the ID "A" is entered and the degrees of similarity (e.g. matching ratio) are generated by comparing the biometric information entered with the pieces of verification information. In this example, the degree of similarity between the biometric information and the verification information "A" is approximately "230"; the degree of similarity between the biometric information and the verification information "B" is approximately "20"; and the degree of similarity between the biometric information and the verification information "C" is approximately "110".

That is, in this example, not only the degree of similarity between the biometric information and the verification information "A", but also the degree of similarity between the biometric information and the verification information "C"

exceed corresponding thresholds set for the pieces of verification information "A" and "C". In such a case where the degrees of similarity of multiple pieces of verification information exceed the corresponding thresholds and the difference between the degrees of similarity is small, the verification method according to the embodiment changes the thresholds corresponding to these pieces of verification information to be stricter, thereby reducing the probability of identification errors occurring. In the embodiment, the thresholds are made higher. In the example shown in FIG. 1B, the threshold for the verification information "A" and the threshold for the verification information "C" are changed to "200".

Figure 1C:
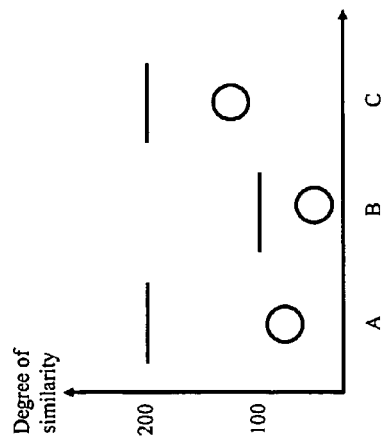
FIG. 1C illustrates the verification method according to the embodiment.

FIG. 1C illustrates a state in which biometric information of the user corresponding to the ID "A" is entered again and the degrees of similarity are generated by comparing the biometric information entered with the pieces of verification information. In this example, the biometric information entered is of low quality for some reason, such as by placing a finger roughly in a fingerprint verification process. As a result, the degree of similarity between the biometric information and the verification information "A" is approximately "80"; the degree of similarity between the biometric information and the verification information "B" is approximately "20"; and the degree of similarity between the biometric information and the verification information "C" is approximately "110".

If the threshold for the verification information "A" and the threshold for the verification information "C" had not changed and remained as the initial values "100", "C" is identified as the user since "C" solely has the degree of similarity exceeding the threshold "100". However, because the thresholds are updated as shown in FIG. 1B, none of the degrees of similarity with the pieces of verification information exceed the corresponding thresholds. As a result, a verification error is prevented from occurring.

FIG. 1D illustrates a state in which biometric information of the user corresponding to the ID "A" is entered again and the degrees of similarity are generated by comparing the biometric information entered with the pieces of verification information. In this example, the input biometric information is of normal quality, and, as in FIG. 1B, the degree of similarity between the biometric information and the verification information "A" is approximately "230"; the degree of similarity between the biometric information and the verification information "B" is approximately "20"; and the degree of similarity between the biometric information and the verification information "C" is approximately "110".

In this state, the degrees of similarly generated are the same as those generated in the state illustrated in FIG. 1B. However, only the degree of similarity with the verification information "A" exceeds the corresponding threshold. Therefore, the user is correctly identified as "A". In this manner, the verification method according to the embodiment provides a threshold for each piece of verification information, and, if the degrees of similarity between a plurality of pieces of verification information and biometric information entered during operation exceed corresponding thresholds, the thresholds are dynamically changed. Accordingly, verification errors are prevented from occurring even in the case where biometric information of low quality has been entered.

Next, the structure of the verification apparatus 100 according to the embodiment will be described. FIG. 2 is a functional block diagram of the structure of the verification apparatus 100 according to the embodiment. As shown in FIG. 2, the verification-apparatus 100 includes a biometric-information input unit 110, a notifying unit 120, a control unit 130, and a storage unit 140.

The biometric-information input unit 110 is a processor configured to input biometric information. For example, the biometric-information input unit 110 includes a fingerprint sensor, a vein sensor, or the like. The notifying unit 120 is a processor configured to notify a user requesting the verification apparatus 100 to identify the user of various types of information. The notifying unit 120 includes a liquid crystal display (LCD) or the like. The notifying unit 120 may also be configured to send the identification result to another device via a network or the like.

The control unit 130 is a controller configured to control the entire verification apparatus 100. The control unit 130 includes a verification control unit 131, a degree-of-similarity generating unit 132, a verification unit 133, a representative-degree-of-similarity updating unit 134, a threshold updating unit 135, and a registrant-information deleting unit 136. The verification control unit 131 is a control unit configured to control, in order to identify a person, the biometric-information input unit 110, the notifying unit 120, the degree-of-similarity generating unit 132, the verification unit 133, the representative-degree-of-similarity updating unit 134, and the threshold updating unit 135. A control operation performed by the verification control unit 131 will be described in detail in descriptions of processes later.

The degree-of-similarity generating unit 132 is a processor configured to generate the degrees of similarity by comparing biometric information input from the biometric-information input unit 110 with pieces of verification information registered as registrant information 141 in the storage unit 140. The degrees of similarity generated by the degree-of-similarity generating unit 132 may be absolute values, such as similarity scores, or relative values evaluated in a stepwise manner, such as similarity levels.

FIG. 3 illustrates examples of the registrant information 141. The registrant information (e.g. enrollment database) 141 is pre-stored information regarding a registrant serving as a user to be identified. The registrant information 141 includes items in fields including ID, threshold, representative degree of similarity, and verification information. The ID field is for registering an identification number for identifying a registrant. The threshold field is for saving a threshold with which the degree of similarity is compared for identification.

The representative-degree-of-similarity field is for saving a representative value of the degrees of similarity generated by the degree-of-similarity generating unit 132 when the corresponding registrant has been identified correctly. In this embodiment, the minimum degree of similarity is regarded as the representative degree of similarity. Alternatively, however, the average of the degrees of similarity may be regarded as the representative degree of similarity. The verification information field is for registering biometric information itself obtained from the registrant or feature information of the biometric information.

Among the foregoing fields, the threshold field and the representative-degree-of-similarity field are set to predetermined initial values in an initial state. For example, the threshold field is initially set to a value adjusted such that the false accept rate will be less than or equal to a predetermined rate, and the representative-degree-of-similarity field is initially set to "0". During operation, the threshold is updated by the threshold updating unit 135, and the representative degree of similarity value is updated by the representative-degree-of-similarity updating unit 134.

The fields of the registrant information 141 may be specified using additional registration means included in the verification apparatus 100, which adds ID and the like to verification information input from the biometric-information input unit 110. Alternatively, the fields of the registrant information 141 may be specified by transferring field values and information entered using another device to the verification apparatus 100 via a certain medium. Alternatively, the registrant information 141 may be stored in another device, and the verification apparatus 100 may be configured to access the registrant information 141 via a network.

The verification unit 133 is a processor configured to compare thresholds saved in the corresponding field of the registrant information 141 with the degrees of similarity generated by the degree-of-similarity generating unit 132 by comparing pieces of verification information corresponding to the thresholds with biometric information input from the biometric-information input unit 110. The representative-degree-of-similarity updating unit 134 is a processor configured to update, when a user identification process determines that verification information registered in the corresponding field of the registrant information 141 is that user's verification information, the representative degree of similarity corresponding to that verification information.

The threshold updating unit 135 is a processor configured to update the thresholds saved in the corresponding field of the registrant information 141 when it is likely that a verification error will occur due to the current threshold settings, such as when a plurality of pieces of verification information with which the degrees of similarity exceed the corresponding thresholds are found as a result of comparing the degree of similarity with the threshold in units of pieces of verification information registered in the corresponding field of the registrant information 141. The threshold updating unit 135 is configured to record, when the threshold is updated, which piece of verification information has the degree of similarity associated with the updating of the threshold in a threshold updating history 142 in the storage unit 140.

FIG. 4 illustrates an example of the threshold updating history 142. As shown in FIG. 4, the threshold updating history 142 has fields including target ID, threshold fluctuation range, and related ID. The target ID field is for storing the ID corresponding to verification information whose threshold has been updated. The threshold fluctuation range field is for storing the fluctuation range before and after the updating of the threshold. The related ID field is for storing a list of IDs corresponding to pieces of verification information due to which the threshold has been updated since the degrees of similarity generated with these pieces of verification information might have caused an identification error.

The registrant-information deleting unit 136 is a processor configured to delete information in units of lines from the registrant information 141 on the basis of an instruction given from an administrator or the like. When deleting a line from the registrant information 141, the registrant-information deleting unit 136 refers to the threshold updating history 142 and updates the registrant information 141 so that thresholds of the other piece(s) of verification information which have been set to strict values in association with verification information in that line will become more lenient. In the example of the embodiment, the thresholds are made lower.

In this manner, when deleting a piece of verification information, thresholds that have been set to strict values in association with the deleted piece of verification information are made more lenient. Accordingly, the false reject rate is reduced, and an easy-to-use system can be realized.

Figure 5B:
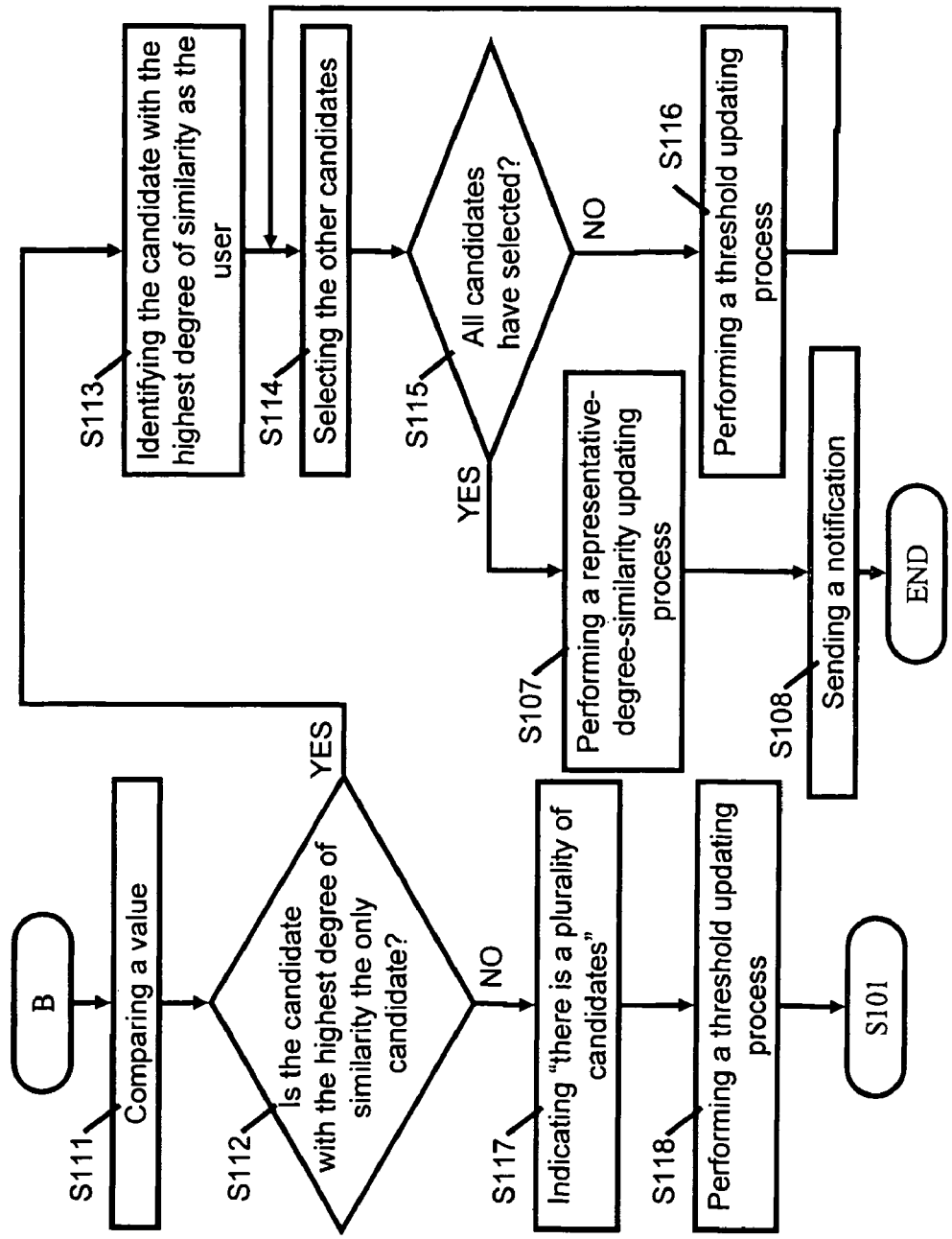

Next, processes performed by the verification apparatus 100 will be described. FIGS. 5A and 5B are flowcharts of a verification process. The verification process is the process performed when biometric information is entered by a user to the verification apparatus 100 and the verification apparatus 100 is requested to identify the user. In the following description of the process, it is regarded that the larger the threshold, the stricter the identification process. However, this relationship may be reversed.

The verification control unit 131 allows the biometric-information input unit 110 to input biometric information (step S101). The verification control unit 131 allows the degree-of-similarity generating unit 132 and the verification unit 133 to perform a user candidate extracting process described later to extract user candidates from the registrant information 141 on the basis of comparisons between the degrees of similarity and corresponding thresholds (step S102). If no user candidate is found (no in step S103), the verification control unit 131 allows the notifying unit 120 to send a notification indicating "no candidate" (step S104). The flow returns to step S101, and the verification control unit 131 allows the biometric-information input unit 110 to input biometric information again. In step S103, which of the matching ratios exceed the threshold value is determined.

In contrast, if a user candidate(s) is/are found (yes in step S103), and the number of user candidates is one (yes in step S105), the verification control unit 131 identifies that candidate as the user (step S106). The verification control unit 131 allows the representative-degree-of-similarity updating unit 134 to perform a representative-degree-of-similarity updating process described later (step S107). The verification control unit 131 allows the notifying unit 120 to send a notification of the identification result (step S108). The notification in the case where the user has been identified is given by, for example, displaying a message indicating that the user has been identified on a display screen, or transmitting the ID of the candidate identified as the user to another device.

In contrast, if a user candidate(s) is/are found (yes in step S103) and the number of user candidates found is plural (no in step S105), the verification control unit 131 selects the candidate with the highest degree of similarity (step S109). The verification control unit 131 retrieves the threshold of that candidate (step S110). The verification control unit 131 compares a value obtained by subtracting a predetermined margin from the obtained threshold with the degree of similarity of another candidate (step S111).

If there is no other candidate having the degree of similarity that exceeds the value obtained by subtracting the predetermined margin from the obtained threshold, the threshold of the candidate with the highest degree of similarity is strict enough. If the candidate with the highest degree of similarity is the only candidate with the degree of similarity exceeding the threshold (yes in step S112), the verification control unit 131 identifies the candidate with the highest degree of similarity as the user (step S113).

The margin used here is for adjusting the strictness of the identification process and can be decided arbitrarily according to the purpose of using the verification apparatus 100 or the like. For example, the margin may be zero. Alternatively, instead of comparing the value obtained by subtracting the margin from the threshold of the candidate with the highest degree of similarity with the degree of similarity of another candidate, a value obtained by subtracting a margin from the degree of similarity of the candidate with the highest degree of similarity may be compared with the degree of similarity of another candidate.

Thereafter, the verification control unit 131 selects the other candidates one at a time (step S114 and no in step S115), and the verification control unit 131 allows the threshold updating unit 135 to perform a threshold updating process described later to reset the threshold of another candidate selected to a strict value (step S116). In step S116 the threshold is adjusted. After completion of the process on all the other candidates (yes in step S115), the verification control unit 131 allows the representative-degree-of-similarity updating unit 134 to perform the representative-degree-of-similarity updating process described later (step S107). The verification control unit 131 allows the notifying unit 120 to send a notification of the identification result (step S108).

If there is/are (an) other user candidate(s) even in the case where the user has been identified correctly, a verification error may occur the next time the verification apparatus 100 is requested to identify the user if biometric information of low quality is entered by the user for a certain reason. In such a case, the probability of an identification error occurring can be reduced by resetting the threshold(s) of the other user candidate(s) to a stricter value(s).

In the case where there is another candidate with the degree of similarity exceeding the value obtained by subtracting the predetermined margin from the obtained threshold (no in step S112), verification information of a person other than the user may happen to have the highest degree of similarity due to the input biometric information of low quality or the like, and the verification control unit 131 allows the notifying unit 120 to send a notification indicating that there is a plurality of candidates (step S117). The verification control unit 131 allows the threshold updating unit 135 to perform the threshold updating process described later to reset the thresholds of all the user candidates extracted in step S102 to stricter values (step S118). The flow returns to step S101.

Figure 6:
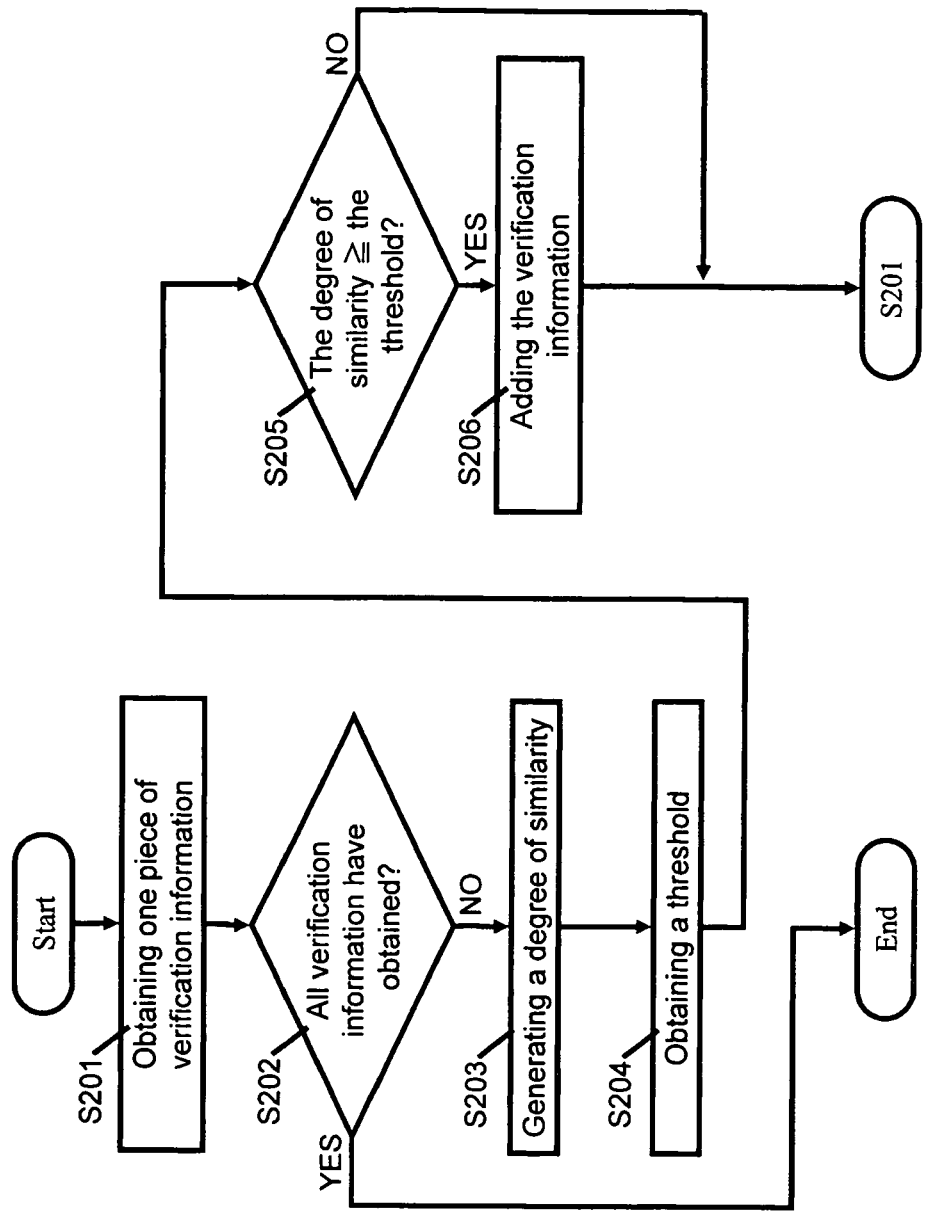
FIG. 6 is a flowchart of a process of extracting user candidates.

FIG. 6 is a flowchart of a process of extracting user candidates. As shown in FIG. 6, the degree-of-similarity generating unit 132 obtains one piece of verification information from the registrant information 141 (step S201). If the verification information is obtained successfully (no in step S202), the degree-of-similarity generating unit 132 generates the degree of similarity by comparing the biometric information input from the biometric-information input unit 110 with the obtained piece of verification information (step S203).

The verification unit 133 obtains a threshold corresponding to the verification information from the registrant information 141 (step S204). If the degree of similarity generated by the degree-of-similarity generating unit 132 is greater than or equal to the obtained threshold (yes in step S205), the verification unit 133 adds the verification information as a user candidate (step S206). The foregoing process is repeated, and, if all pieces of verification information have been obtained in step S201 (yes in step S202), the flow ends.

Figure 7:
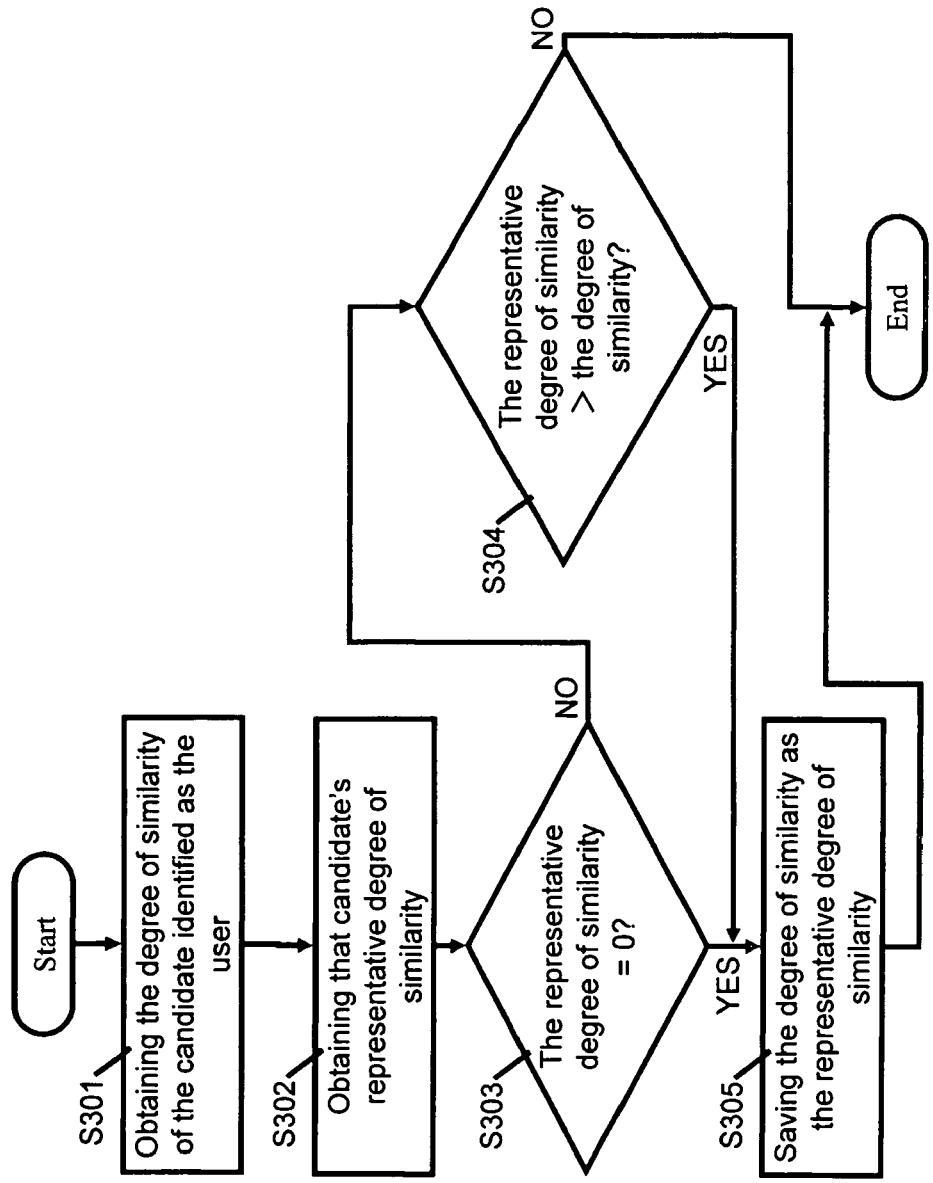
FIG. 7 is a flowchart of a process of updating a representative degree of similarity.

FIG. 7 is a flowchart of a process of updating the representative degree of similarity. As shown in FIG. 7, the representative-degree-of-similarity updating unit 134 obtains the degree of similarity of the candidate identified as the user (step S301). The representative-degree-of-similarity updating unit 134 obtains that candidate's representative degree of similarity from the registrant information 141 (step S302). If the representative degree of similarity is zero, that is, the representative degree of similarity has not been set yet (yes in step S303), or if the representative degree of similarity is not zero, that is, the representative degree of similarity has already been set (no in step S303) and is greater than the degree of similarity (yes in step S304), the representative-degree-of-similarity updating unit 134 saves the degree of similarity as the representative degree of similarity in the corresponding field of the registrant information 141.

The foregoing process is the process performed in the case where the minimum degree of similarity of the candidate identified as the user serves as the representative degree of similarity. If a value other than the minimum value serves as the representative value, the process may be changed.

Figure 8A:
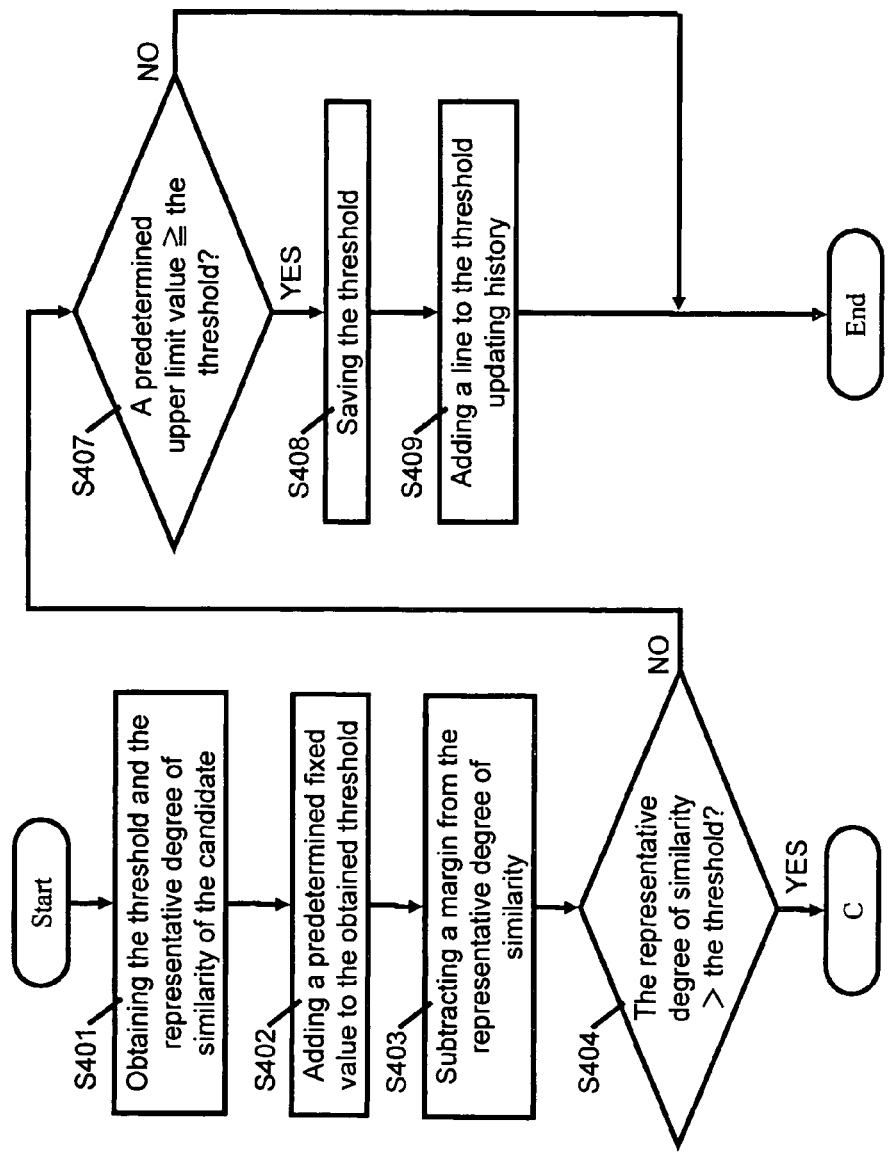
FIGS. 8A and 8B are flowcharts of a process of updating a threshold.
Figure 8B:
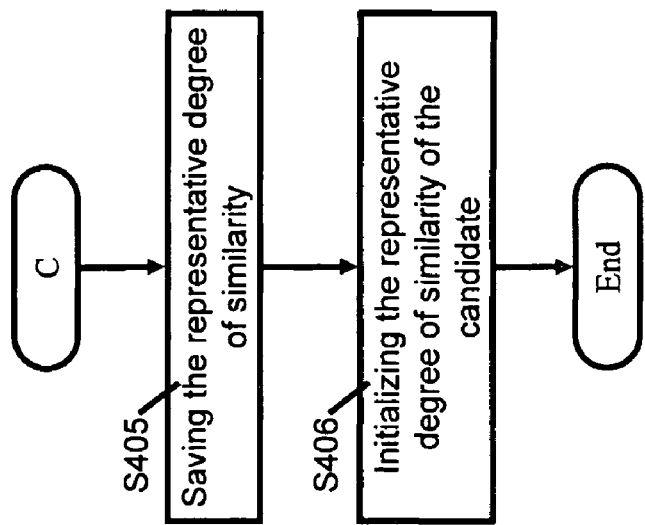

FIGS. 8A and 8B are flowcharts of a process of updating the threshold. As shown in FIGS. 8A and 8B, the threshold updating unit 135 obtains, from the registrant information 141, the threshold and the representative degree of similarity of the candidate for which the process is being performed (step S401). The threshold updating unit 135 adds a predetermined fixed value to the obtained threshold in order to make the identification process stricter (step S402). The threshold updating unit 135 subtracts, from the representative degree of similarity, a margin that has been set by taking into consideration variations among the quality of biometric information and the like (step S403).

The fixed value for making the identification process stricter can be decided arbitrary according to the purpose of using the verification apparatus 100 or the like. Instead of the fixed value, an output of a function having the degree of similarity as an argument may be used as the value to be added to the threshold for making the identification process stricter. The function with the degree of similarity as an argument is, for example, a function that outputs a smaller value as the degree of similarity becomes larger.

If the representative degree of similarity is greater than the threshold (yes in step S404), the threshold updating unit 135 saves the representative degree of similarity as the threshold of the candidate in the corresponding field of the registrant information 141 (step S405). The threshold updating unit 135 initializes the representative degree of similarity of the candidate in the corresponding field of the registrant information 141 to "zero" in order to start new evaluation of the representative degree of similarity (step S406).

In contrast, in the case where the representative degree of similarity is less than or equal to the threshold (no in step S404), if the threshold is less than or equal to a predetermined upper limit value (yes in step S407), the threshold updating unit 135 saves the threshold as the threshold of the candidate in the corresponding field of the registrant information 141 (step S408). The threshold updating unit 135 adds a line to the threshold updating history 142, sets the target ID field to the ID of the candidate, sets the threshold fluctuation range field to the foregoing fixed value, and sets the related ID field to a list of IDs of the other candidates (step S409).

If the threshold exceeds the predetermined upper limit value (no in step S407), the user will probably not be identified correctly when the threshold becomes too strict by updating the threshold. Therefore, the threshold is not updated.

Figure 9:
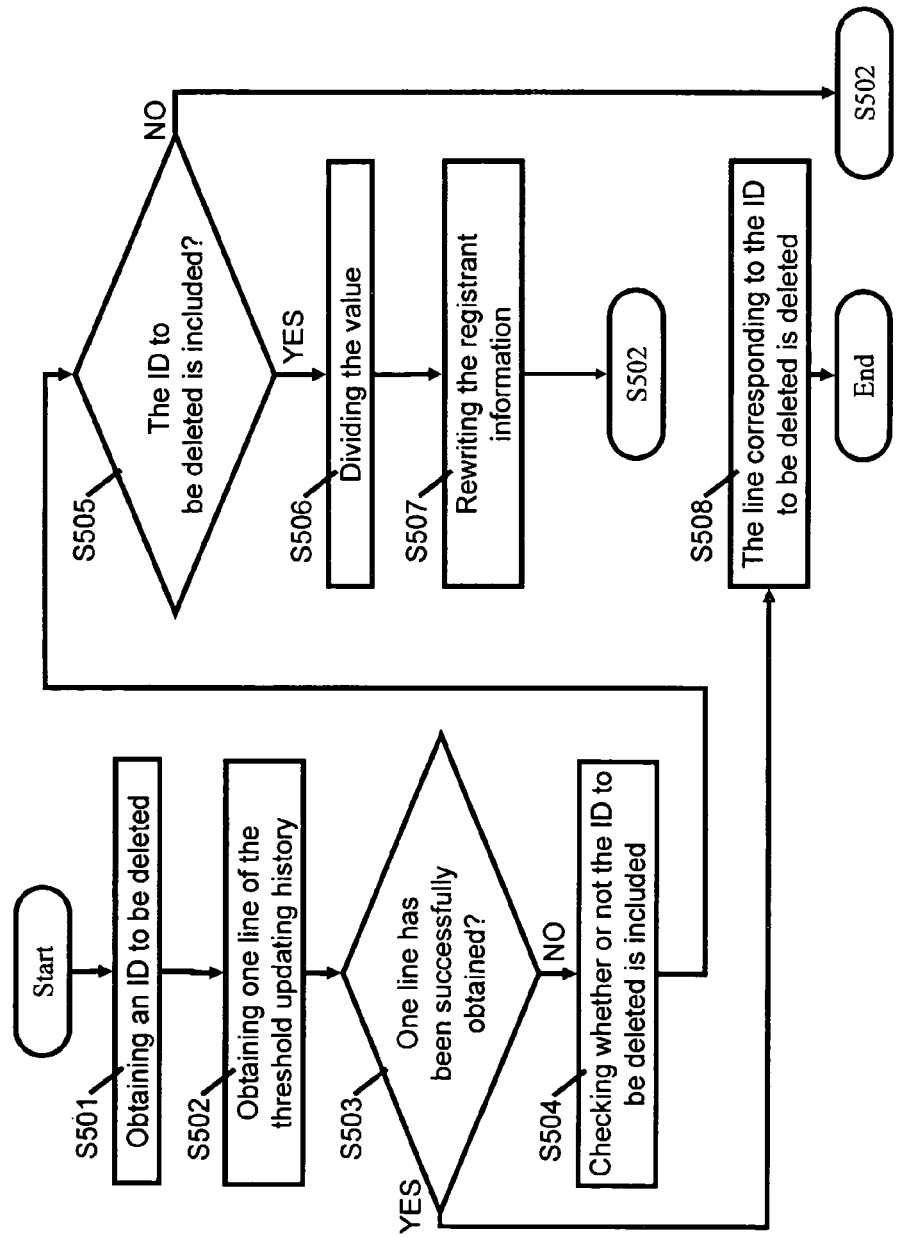
FIG. 9 is a flowchart of a process of deleting registrant information.

FIG. 9 is a flowchart of a process of deleting the registrant information 141. This process is performed by the registrant-information deleting unit 136 in the case where an instruction is given by an administrator or the like to delete a particular line of the registrant information 141.

As shown in FIG. 9, the registrant-information deleting unit 136 obtains an ID to be deleted (step S501). The registrant-information deleting unit 136 obtains one line of the threshold updating history 142 (step S502). If one line has been successfully obtained (no in step S503), the registrant-information deleting unit 136 checks whether or not the ID to be deleted is included in the related ID field of that line (step S504).

If the ID to be deleted is included in the related ID field of that line (yes in step S505), the registrant-information deleting unit 136 divides the value in the threshold fluctuation range field of that line by the number of IDs included in the related ID field of that line (step S506). The registrant-information deleting unit 136 rewrites the registrant information 141 so that the threshold corresponding to the ID in the target ID field of that line becomes a value obtained by subtracting the quotient from the threshold (step S507).

The processing in steps S502 to S507 is repeated. If all lines of the threshold updating history 142 have been obtained in step S502 (yes in step S503), the line corresponding to the ID to be deleted is deleted from the registrant information 141 (step S508).

Various changes can be made to the structure of the verification apparatus 100 according to the embodiment, which is shown in FIG. 2, without departing from the scope of the embodiment. For example, portions of the structure of the verification apparatus 100, such as the entire control unit 130 and the entire storage unit 140, may be moved to a server connected to the verification apparatus 100 via a network, and a server-client configuration for identifying a user by transferring information between the verification apparatus 100 and the server can be realized.

Alternatively, the functions of the control unit 130 of the verification apparatus 100 may be implemented as software, and the software may be executed on a computer, thereby realizing functions equivalent to those of the verification apparatus 100. Hereinafter, an exemplary computer configured to execute a verification program 1071 implementing the functions of the control unit 130 as software will be described.

Figure 10:
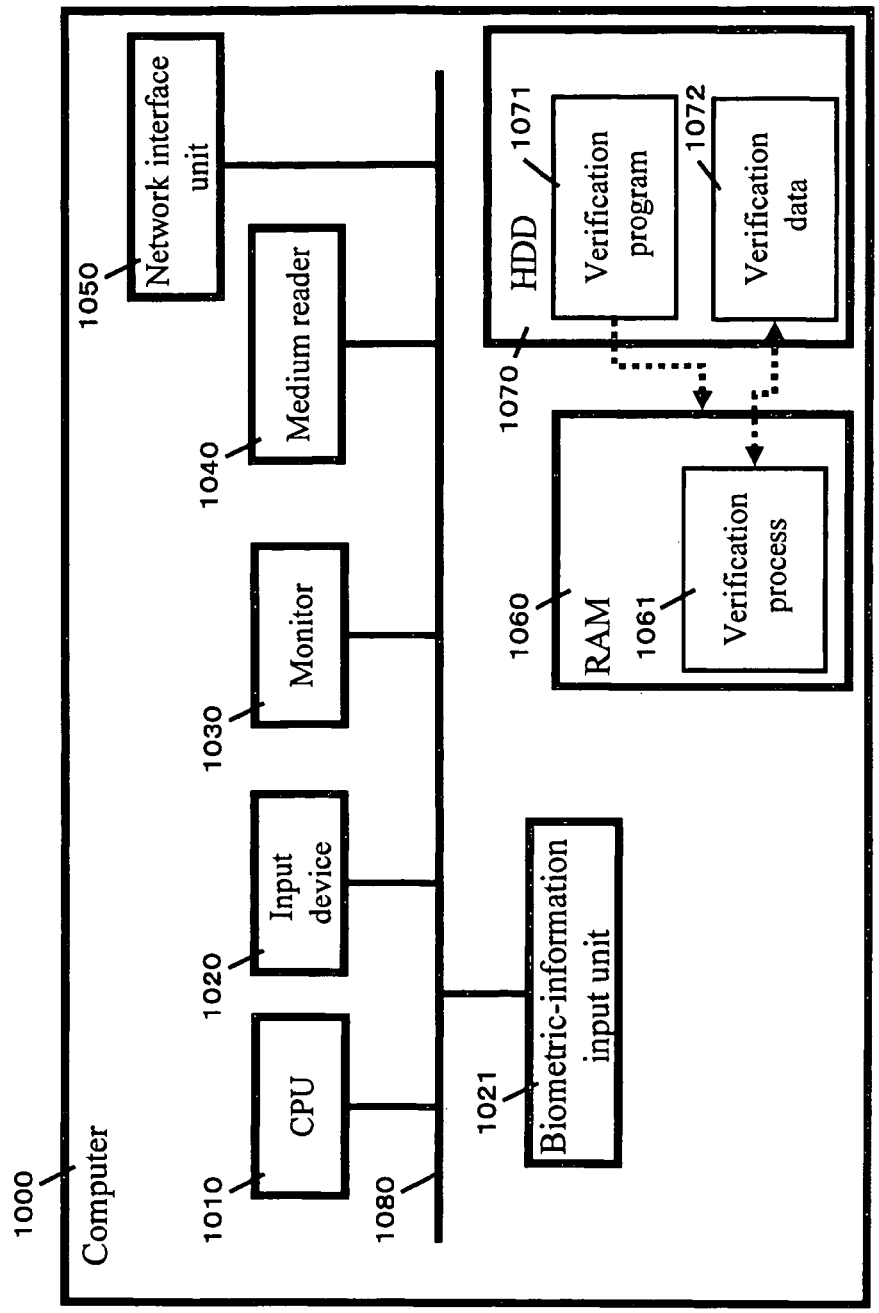
FIG. 10 is a functional block diagram of a computer executing a verification program.

FIG. 10 is a functional block diagram of a computer 1000 configured to execute the verification program 1071. The computer 1000 includes a central processing unit (CPU) 1010 configured to perform various arithmetic operations, an input unit 1020 configured to accept data entered by a user, a biometric-information input unit 1021 configured to input biometric information of a user, a monitor 1030 configured to display various types of information, a medium reader 1040 configured to read a program or the like from a recording medium, a network interface unit 1050 configured to transfer data to and from another computer via a network, a random access memory (RAM) 1060 configured to temporarily store various types of information, and a hard disk drive (HDD) 1070, which are interconnected via a bus 1080.

Alternatively, the biometric-information input unit 1021 may be included in another device, and biometric information input in that device may be transmitted to the computer 1000 via a network. The computer 1000 may perform an identification process and return the identification result.

The HDD 1070 stores the verification program 1071 having the same or similar functions as those of the control unit 130 shown in FIG. 2 and verification data 1072 corresponding to various types of data stored in the storage unit 140 shown in FIG. 2. Alternatively, the verification data 1072 may be distributed among and stored in other computers connected to the computer 1000 via a network.

The CPU 1010 loads the verification program 1071 from the HDD 1070 and expands the verification program 1071 in the RAM 1060, and the verification program 1071 starts functioning as a verification process 1061. The verification process 1061 expands information and the like read from the verification data 1072 in an area allocated thereto on the RAM 1060 as needed, and various types of data processing are performed on the basis of the expanded data and the like.

The foregoing verification program 1071 may not necessarily be stored in the HDD 1070. Alternatively, the verification program 1071 stored on a storage medium, such as a compact-disc read-only memory (CD-ROM) or the like, may be read and executed by the computer 1000. Alternatively, the verification program 1071 may be stored in another computer (or server) connected to the computer 1000 via a public line, the Internet, a local area network (LAN), a wide area network (WAN), or the like, and the computer 1000 may read and execute the verification program 1071 stored in the other computer (or server).

As has been described above, according to the first embodiment, an identification threshold is provided in units of pieces of pre-registered verification information, and, if there is a plurality of pieces of verification information with which degrees of similarity generated by comparing the pieces of verification information with biometric information entered by a user exceed the corresponding thresholds, the thresholds corresponding to these pieces of verification information are reset to stricter values. Accordingly, the thresholds for pieces of verification information with high degrees of similarity become stricter, and, even if biometric information of low quality is entered by the user, the user can be identified with high accuracy.

In the foregoing embodiment, the technique of reducing the threshold when information is deleted from the registrant information 141 has been described. Alternatively, the threshold may be reduced in accordance with the result of comparing the degree of similarity with the threshold. More specifically, a counter may be provided for each threshold. In the case where the comparison between the degree of similarity generated by the degree-of-similarity generating unit 132 and the threshold gives the result that the degree of similarity falls below the threshold within a predetermined range, that is, in the case where the degree of similarity is less than the threshold but close to the threshold, if there is no other verification information with a degree of similarity greater than or equal to a value obtained by subtracting a margin from that threshold, a counter for that threshold is incremented. In contrast, if there is such other verification information, a counter for that threshold is initialized to zero. If the counter value exceeds a predetermined value, the threshold corresponding to the counter is reduced by one step. This reduces the threshold corresponding to verification information that should have been identified as the user but has not been identified as the user for a plurality of times since the threshold has been made higher.

Second Embodiment

According to a second embodiment of the present technique, modifications of the processes performed by the verification apparatus 100 according to the first embodiment will be described. Since the structure of the verification apparatus 100 for performing these modified processes is similar to that of the verification apparatus 100 shown in FIG. 2, a repeated description thereof is omitted.

Figure 11A:
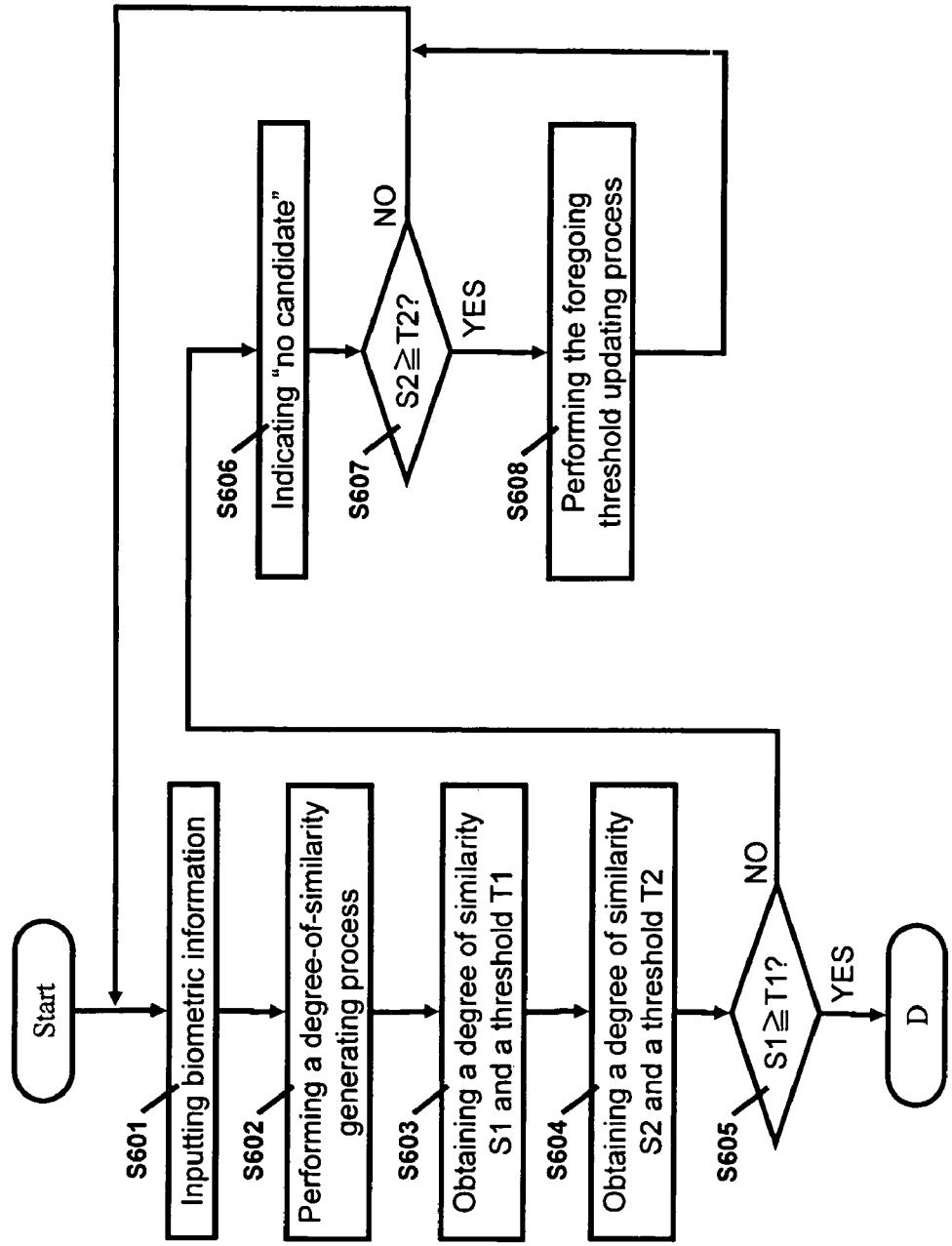
FIGS. 11A and 11B are flowcharts of a verification process.
Figure 11B:
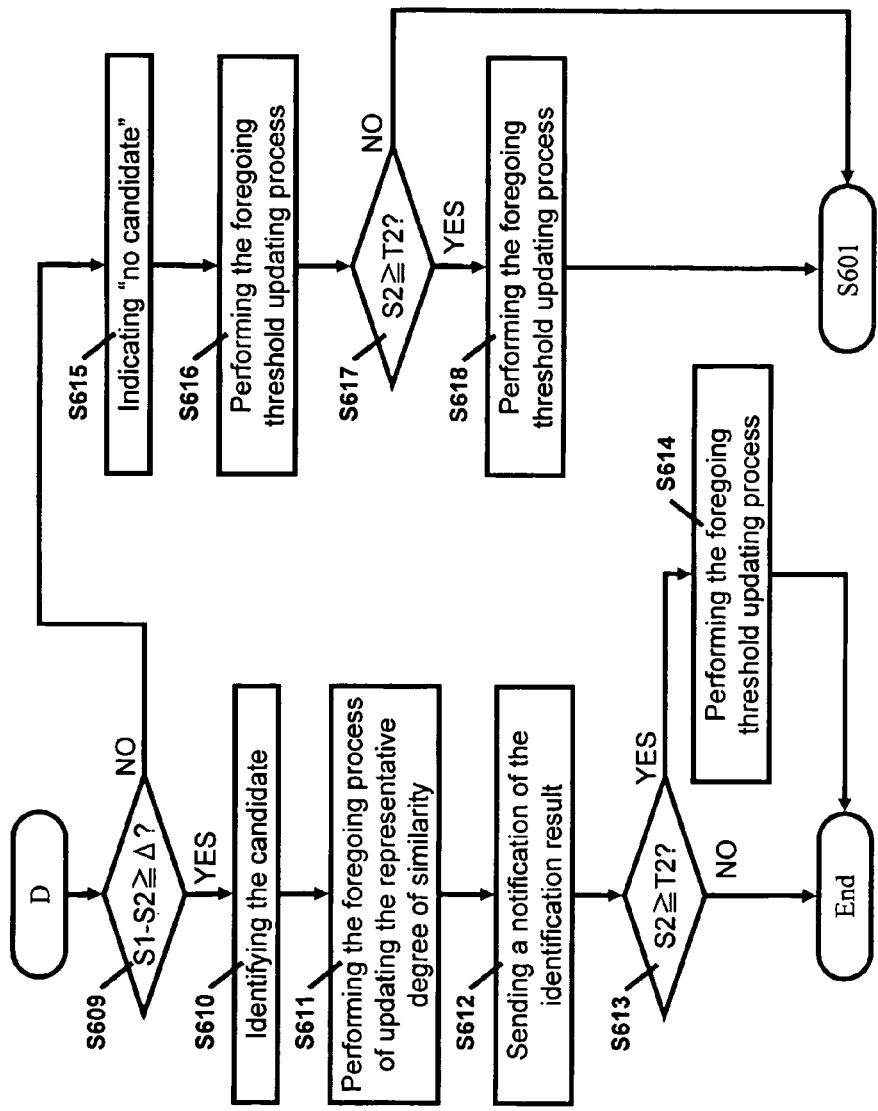

FIGS. 11A and 11B are flowcharts of a verification process. The verification control unit 131 allows the biometric-information input unit 110 to input biometric information (step S601). The verification control unit 131 allows the degree-of-similarity generating unit 132 to perform a degree-of-similarity generating process described later to generate the degree of similarity with each of the pieces of verification information registered in the corresponding field of the registrant information 141 (step S602).

The verification control unit 131 obtains a degree of similarity S1 and a threshold T1 of the candidate for which the highest degree of similarity has been generated (hereinafter referred to as the "candidate with the highest degree of similarity") (step S603). The verification control unit 131 obtains a degree of similarity S2 and a threshold T2 of the candidate for which the second highest degree of similarity has been generated (hereinafter referred to as the "candidate with the second highest degree of similarity") (step S604).

If S1 is less than T1 (no in step S605), the candidate with the highest degree of similarity cannot be identified as the user, and the other candidates cannot be identified as the user either. Thus, the verification control unit 131 allows the notifying unit 120 to send a notification indicating "no candidate" (step S606). If S2 is less than T2 (no in step S607), the flow returns to step S601, and the verification control unit 131 allows the biometric-information input unit 110 to input biometric information again.

If S2 is greater than or equal to T2 (yes in step S607), the candidate with the second highest degree of similarity, who is not the user, may be incorrectly identified as the user by performing a verification process the next time and thereafter. Therefore, the verification control unit 131 allows the threshold updating unit 135 to perform the foregoing threshold updating process to reset the threshold of the candidate with the second highest degree of similarity to a stricter value, and the flow returns to step S601 (step S608). For the candidate with the third highest degree of similarity and onward, if the degree of similarity is higher than the corresponding threshold, the threshold may be reset to a stricter value in a similar manner.

In contrast, if S1 is greater than or equal to T1 (yes in step S605) and the difference between S1 and S2 is greater than or equal to a predetermined difference Δ and is sufficiently large (yes in step S609), the verification control unit 131 identifies the candidate with the highest degree of similarity as the user (step S610). The verification control unit 131 allows the representative-degree-of-similarity updating unit 134 to perform the foregoing process of updating the representative degree of similarity (step S611). Further, the verification control unit 131 allows the notifying unit 120 to send a notification of the identification result (step S612). The predetermined difference Δ for evaluating the difference between S1 and S2 may be decided arbitrarily according to the purpose of using the verification apparatus 100 or the like.

If S2 is greater than or equal to T2 (yes in step S613), the candidate with the second highest degree of similarity, who is not the user, may be incorrectly identified as the user by performing a verification process the next time and thereafter. Therefore, the verification control unit 131 allows the threshold updating unit 135 to perform the foregoing threshold updating process to reset the threshold of the candidate with the second highest degree of similarity to a stricter value (step S614). For the candidate with the third highest degree of similarity and onward, if the degree of similarity is higher than the corresponding threshold, the threshold may be reset to a stricter value in a similar manner.

In contrast, if S1 is greater than or equal to T1 (yes in step S605) and the difference between S1 and S2 is less than the predetermined difference Δ (no in step S609), the candidate with the highest degree of similarity may happen to have the highest degree of similarity due to the input biometric information of low quality or the like. Therefore, the verification control unit 131 allows the notifying unit 120 to send a notification indicating "no candidate" (step S615). In order to prevent verification errors from occurring, the verification control unit 131 allows the threshold updating unit 135 to perform the foregoing threshold updating process to reset the threshold of the candidate with the highest degree of similarity to a stricter value (step S616). If S2 is less than T2 (no in step S617), the flow returns to step S601, and the verification control unit 131 allows the biometric-information input unit 110 to input biometric information again.

In contrast, if S2 is greater than or equal to T2 (yes in step S617), the candidate with the second highest degree of similarity, who is not the user, may be incorrectly identified as the user by performing a verification process the next time and thereafter. Therefore, the verification control unit 131 allows the threshold updating unit 135 to perform the foregoing threshold updating process to reset the threshold of the candidate with the second highest degree of similarity to a stricter value (step S618). For the candidate with the third highest degree of similarity and onward, if the degree of similarity is higher than the corresponding threshold, the threshold may be reset to a stricter value in a similar manner.

FIG. 12 is a flowchart of a process of generating the degree of similarity. As shown in FIG. 12, the degree-of-similarity generating unit 132 obtains one piece of verification information from the registrant information 141 (step S701). If the verification information is obtained successfully and not all pieces of verification information have been obtained yet (no in step S202), the degree-of-similarity generating unit 132 generates the degree of similarity by comparing the biometric information input from the biometric-information input unit 110 with the obtained piece of verification information (step S703). The foregoing process is repeated, and, if all pieces of verification information have been obtained in step S701 (yes in step S702), the process ends.

As has been described above, the thresholds for pieces of verification information with high degrees of similarity are set to strict values by controlling the thresholds on the basis of the degrees of similarity and the thresholds of the candidates with the highest and second highest degrees of similarity. Even if biometric information of low quality is entered by the user, the user can be identified with high accuracy.

According to the embodiment, an identification threshold is provided in units of pieces of pre-registered verification information, and, if there is a plurality of pieces of verification information with which degrees of similarity generated by comparing the pieces of verification information with biometric information entered by a user exceed the corresponding thresholds, the thresholds corresponding to these pieces of verification information are reset to stricter values. Accordingly, the thresholds for pieces of verification information with high degrees of similarity become stricter, and, even if biometric information of low quality is entered by the user, the user can be identified with high accuracy.

As has been described above, a verification apparatus, a verification method, and a verification program according to the embodiments of the present technique are effective in verifying whether or not a user is a pre-registered registrant, and in particular, are suitable for identifying the user with high accuracy even in the case where biometric information of low quality has been input.

What is claimed is:

1. A method of adjusting reference information for biometric authentication, comprising:
   storing the reference information including reference biometric data and threshold values corresponding to a plurality of users, respectively;
   obtaining biometric data of a user by inputting biometric information of the user;
   calculating a matching ratio of the biometric data with the reference biometric data of each of the users, respectively;
   comparing the matching ratio of each of the users with the threshold value of each of the users, respectively;

determining which of the matching ratios exceed the corresponding threshold values; and increasing the threshold values which are exceeded by the corresponding matching ratios, respectively, on the basis of a comparison of a first threshold value of the user having the highest matching ratio with a second highest matching ratio when the determining indicates that at least two of the matching ratios exceed the corresponding threshold values and that a difference between the first threshold value and the second highest matching ratio is smaller than a predetermined value so that both the first threshold value and a second threshold value of the user having the second highest matching ratio become larger than the second highest matching ratio.

2. The method of claim 1, further comprising repeating the obtaining, the calculating, the comparing, the determining and the adjusting until a difference between the highest matching ratio and a second matching ratio becomes not less than a predetermined value.

3. The method of claim 1, further comprising repeating the obtaining, the calculating, the comparing, the determining and the adjusting until a difference between the threshold value of a user having the highest matching ratio and a second highest matching ratio becomes not less than a predetermined difference.

4. The method of claim 1, wherein the adjusting adjusts on the basis of an upper limit value.

5. The method of claim 1, further comprising deleting the reference information, wherein the adjusting stores information of a user corresponding to a threshold value to be updated in association with information of a plurality of users besides the user, the user and the plurality of users being determined on the basis of the determining into a storage and the deleting deletes the reference information in reference to the storage.

6. A biometric authentication apparatus comprising:
a storage for storing reference biometric data and threshold values corresponding to a plurality of users, respectively; and
a processor for obtaining biometric data of a user by inputting biometric information of the user, calculating a matching ratio of the biometric data with the reference biometric data of each of the users, performing authentication by comparison of the matching ratio of each of the users with the threshold value of each of the users, respectively, said processor providing an adjustment mechanism for adjusting the reference information, the adjusting mechanism comprising:
obtaining biometric data of a user by inputting biometric information of the user;
calculating a matching ratio of the biometric data with the reference biometric data of each of the users, respectively;
comparing the matching ratio of each of the users with the threshold value of each of the users, respectively;
determining which of the matching ratios exceed the corresponding threshold values; and
increasing the threshold values which are exceeded by the corresponding matching ratios, respectively, on the basis of a comparison of a first threshold value of the user having the highest matching ratio with a second highest matching ratio when the determining indicates that at least two of the matching ratios exceed the corresponding threshold values and that a difference between the first threshold value and the second highest matching ratio is smaller than a predetermined value so that both the first threshold value and a second threshold value of the user having the second highest matching ratio become larger than the second highest matching ratio.

7. The apparatus of claim 6, wherein the adjusting mechanism further comprises repeating the obtaining, the calculating, the comparing, the determining and the adjusting until a difference between the highest matching ratio and a second matching ratio becomes not less than a predetermined value.

8. The apparatus of claim 6, wherein the adjusting mechanism further comprises repeating the obtaining, the calculating, the comparing, the determining and the adjusting until a difference between the threshold value of a user having the highest matching ratio and a second highest matching ratio becomes not less than a predetermined difference.

9. The apparatus of claim 6, wherein the adjusting adjusts on the basis of an upper limit value.

10. The apparatus of claim 6, wherein the adjusting adjusts on the basis of a matching ratio of a user.

11. A non-transitory computer-readable recording medium that stores a computer program for controlling an apparatus according to a process comprising:
storing the reference information including reference biometric data and threshold values corresponding to a plurality of users, respectively;
obtaining biometric data of a user by inputting biometric information of the user;
calculating a matching ratio of the biometric data with the reference biometric data of each of the users, respectively;
comparing the matching ratio of each of the users with the threshold value of each of the users, respectively;
determining which of the matching ratios exceed the corresponding threshold values; and increasing the threshold values which are exceeded by the corresponding matching ratios, respectively, on the basis of a comparison of a first threshold value of the user having the highest matching ratio with a second highest matching ratio when the determining indicates that at least two of the matching ratios exceed the corresponding threshold values and that a difference between the first threshold value and the second highest matching ratio is smaller than a predetermined value so that both the first threshold value and a second threshold value of the user having the second highest matching ratio become larger than the second highest matching ratio.

12. The non-transitory computer-readable recording medium of claim 11, wherein the process further comprises repeating the obtaining, the calculating, the comparing, the determining and the adjusting until a difference between the highest matching ratio and a second matching ratio becomes not less than a predetermined value.

13. The non-transitory computer-readable recording medium of claim 11, wherein the process further comprises repeating the obtaining, the calculating, the comparing, the determining and the adjusting until a difference between the threshold value of a user having the highest matching ratio and a second highest matching ratio becomes not less than a predetermined difference.

14. The non-transitory computer-readable recording medium of claim 11, wherein the adjusting adjusts on the basis of an upper limit value.

15. The non-transitory computer-readable recording medium of claim 11, wherein the adjusting adjusts on the basis of a matching ratio of a user.

* * * * *